US008898111B2

(12) United States Patent
Lyle et al.

(10) Patent No.: US 8,898,111 B2
(45) Date of Patent: *Nov. 25, 2014

(54) ENFORCING TEMPORAL UNIQUENESS OF INDEX KEYS UTILIZING KEY-VALUED LOCKING IN THE PRESENCE OF PSEUDO-DELETED KEYS

(71) Applicant: International Business Machines Corporation, Armonk, NY (US)

(72) Inventors: Robert W. Lyle, Morgan Hill, CA (US); Ping Wang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/792,625

(22) Filed: Mar. 11, 2013

(65) Prior Publication Data

US 2013/0204846 A1 Aug. 8, 2013

Related U.S. Application Data

(63) Continuation of application No. 13/249,973, filed on Sep. 30, 2011.

(51) Int. Cl.
*G06F 17/30* (2006.01)

(52) U.S. Cl.
CPC .......... *G06F 17/30371* (2013.01); *G06F 17/30* (2013.01)
USPC ......................................... 707/620

(58) Field of Classification Search
USPC ................................................. 707/616, 620
See application file for complete search history.

(56) References Cited

U.S. PATENT DOCUMENTS

| 5,428,774 A | 6/1995 | Takahashi et al. |
| 5,440,730 A | 8/1995 | Elmasri et al. |
| 2008/0104102 A1 | 5/2008 | Zhang |

OTHER PUBLICATIONS

Guang-Jun, Wu et al., HCSIM: An Indexing Method for Long-Lived Frequent Block-Level Snapshot, Chinese Journal of Computers, Oct. 2009, vol. 32, No. 10, pp. 2080 and 2090 (Abstract and Background, respectively), China Computer Federation, Beijing, People's Republic of China.
Tao, Yufei et al., Cost Models for Overlapping and Multi-Version B-trees, 18th International Conference on Data Engineering, 2002, pp. 191-200, IEEE, Piscataway, NJ, United States.
U.S. Appl. No. 13/249,973, entitled Enforcing Temporal Uniqueness of Index Keys Utilizing Key-Valued Locking in the Presence of Pseudo-Deleted Keys, filed Sep. 30, 2011.

*Primary Examiner* — Albert Phillips, III
(74) *Attorney, Agent, or Firm* — Patterson & Sheridan, LLP

(57) ABSTRACT

Techniques are described for identifying conflicts between a prospective temporal key and an index of temporal keys, the index sorted based on a time value associated with each of the temporal keys. Embodiments determine whether a first temporal key within the index of temporal keys conflicts with the prospective temporal key. Here, the keys within the index may be sorted based upon a respective time value associated with each of the keys. Upon determining that the first temporal key conflicts with the prospective temporal key, the prospective temporal key is designated as conflicting with at least one existing temporal key in the index of temporal keys.

8 Claims, 9 Drawing Sheets

| KEY # | ROOM | MEETING END | MEETING BEGIN | PSEUDO-DELETE? |
|---|---|---|---|---|
| 1 | A100 | 2010-01-01-09:00:00 | 2010-01-01-08:00:00 | NO |
| 2 | A100 | 2010-01-01-10:01:00 | 2010-01-01-09:01:00 | YES |
| 3 | A100 | 2010-01-01-11:00:00 | 2010-01-01-10:00:00 | YES |
| 4 | A100 | 2010-01-01-13:00:00 | 2010-01-01-12:00:00 | NO |
| 5 | A100 | 2010-01-01-14:00:00 | 2010-01-01-13:00:00 | YES |
| 6 | A100 | 2010-01-01-16:00:00 | 2010-01-01-14:00:00 | NO |
| 7 | A100 | 2010-01-01-18:00:00 | 2010-01-01-16:00:00 | YES |
| 8 | A200 | 2010-01-01-09:00:00 | 2010-01-01-08:00:00 | YES |

*FIG. 2A*

| KEY # | ROOM | MEETING END | MEETING BEGIN | PSEUDO-DELETE? |
|---|---|---|---|---|
| 1 | A100 | 2010-01-01-09:00:00 | 2010-01-01-08:00:00 | NO |
| 2 | A100 | 2010-01-01-10:01:00 | 2010-01-01-09:01:00 | YES |
| 3 | A100 | 2010-01-01-11:00:00 | 2010-01-01-10:00:00 | YES |
| 4 | A100 | 2010-01-01-13:00:00 | 2010-01-01-12:00:00 | NO |
| 5 | A100 | 2010-01-01-14:00:00 | 2010-01-01-13:00:00 | YES |
| 6 | A100 | 2010-01-01-16:00:00 | 2010-01-01-14:00:00 | NO |
| 7 | A100 | 2010-01-01-18:00:00 | 2010-01-01-16:00:00 | YES |
| 8 | A200 | 2010-01-01-09:00:00 | 2010-01-01-08:00:00 | YES |

FIG. 2B

| KEY # | ROOM | MEETING END | MEETING BEGIN | PSEUDO-DELETE? |
|---|---|---|---|---|
| 1 | A100 | 2010-01-01-09:00:00 | 2010-01-01-08:00:00 | NO |
| 2 | A100 | 2010-01-01-10:01:00 | 2010-01-01-09:01:00 | YES |
| 3 | A100 | 2010-01-01-11:00:00 | 2010-01-01-10:00:00 | YES |
| 4 | A100 | 2010-01-01-13:00:00 | 2010-01-01-12:00:00 | NO |
| 5 | A100 | 2010-01-01-14:00:00 | 2010-01-01-13:00:00 | YES |
| 6 | A100 | 2010-01-01-16:00:00 | 2010-01-01-14:00:00 | NO |
| 7 | A100 | 2010-01-01-18:00:00 | 2010-01-01-16:00:00 | YES |
| 8 | A200 | 2010-01-01-09:00:00 | 2010-01-01-08:00:00 | YES |

*FIG. 2C*

| KEY # | ROOM | MEETING END | MEETING BEGIN | PSEUDO-DELETE? |
|---|---|---|---|---|
| 1 | A100 | 2010-01-01-09:00:00 | 2010-01-01-08:00:00 | NO |
| 2 | A100 | 2010-01-01-10:01:00 | 2010-01-01-09:01:00 | YES |
| 3 | A100 | 2010-01-01-11:00:00 | 2010-01-01-10:00:00 | YES |
| 4 | A100 | 2010-01-01-13:00:00 | 2010-01-01-12:00:00 | NO |
| 5 | A100 | 2010-01-01-14:00:00 | 2010-01-01-13:00:00 | YES |
| 6 | A100 | 2010-01-01-16:00:00 | 2010-01-01-14:00:00 | NO |
| 7 | A100 | 2010-01-01-18:00:00 | 2010-01-01-16:00:00 | YES |
| 8 | A200 | 2010-01-01-09:00:00 | 2010-01-01-08:00:00 | YES |

| KEY # | ROOM | MEETING END | MEETING BEGIN | PSEUDO-DELETE? |
|---|---|---|---|---|
| 1 | A100 | 2010-01-01-09:30:00 | 2010-01-01-08:00:00 | YES |

| KEY # | ROOM | MEETING END | MEETING BEGIN | PSEUDO-DELETE? |
|---|---|---|---|---|
| 2 | A100 | 2010-01-01-10:01:00 | 2010-01-01-09:01:00 | YES |
| 3 | A100 | 2010-01-01-11:00:00 | 2010-01-01-10:00:00 | YES |
| 4 | A100 | 2010-01-01-13:00:00 | 2010-01-01-12:00:00 | NO |
| 5 | A100 | 2010-01-01-14:00:00 | 2010-01-01-13:00:00 | YES |
| 6 | A100 | 2010-01-01-16:00:00 | 2010-01-01-14:00:00 | NO |
| 7 | A100 | 2010-01-01-18:00:00 | 2010-01-01-16:00:00 | YES |
| 8 | A200 | 2010-01-01-09:00:00 | 2010-01-01-08:00:00 | YES |

ENFORCING TEMPORAL UNIQUENESS OF INDEX KEYS UTILIZING KEY-VALUED LOCKING IN THE PRESENCE OF PSEUDO-DELETED KEYS

CROSS-REFERENCE TO RELATED APPLICATIONS

This application is a continuation of co-pending U.S. patent application Ser. No. 13/249,973, filed Sep. 30, 2011. The aforementioned related patent application is herein incorporated by reference in its entirety.

BACKGROUND

Embodiments presented in this disclosure generally relate to database indexes and, more particularly, to techniques for identifying conflicts with temporal keys in a database index.

Databases are computerized information storage and retrieval systems. A relational database management system is a computer database management system ("DBMS") that uses relational techniques for storing and retrieving data. An object-oriented programming database is a database that is congruent with the data defined in object classes and sub-classes. Regardless of the particular architecture, a requesting entity (e.g., an application or the operating system) in a DBMS requests access to a specified database by issuing a database access request. Such requests may include, for instance, simple catalog lookup requests or transactions and combinations of transactions that operate to read, change and add specified records in the database. These requests (i.e., queries) are often made using high-level query languages such as the Structured Query Language ("SQL"). Upon receiving such a request, the DBMS may execute the request against a corresponding database, and return any result of the execution to the requesting entity.

Information is typically retrieved from a database using database queries. A query usually specifies conditions that apply to one or more columns of the database and may specify logical operations to be performed that involve multiple columns. In processing such a query, the DBMS generally searches the database for records that satisfy the conditions specified by the query and returns those records as query results for the query. One way to improve the performance of a query is to use a database index. A database index is generally a data structure that allows data in the database (e.g., in a table) to be located and accessed more efficiently. A query optimizer within the DBMS may evaluate a query and determine that building an index for a table will help the query run faster. The query optimizer could then generate the index, which could be used in both the processing of the current query and in processing subsequent queries against the table as well.

SUMMARY

Embodiments of the present invention provide a method, computer program product and system for identifying conflicts between a prospective temporal key and an index of temporal keys, where the temporal keys in the index are sorted based at least in part on a time value associated with each of the temporal keys. The method, computer program product and system also include determining whether a first range of time specified by a first temporal key overlaps with a prospective range of time specified by the prospective temporal key. Additionally, the method, computer program product and system include determining whether the first temporal key is a pseudo-deleted key. The method, computer program product and system further include determining whether the prospective temporal key conflicts with any temporal keys in the index of temporal keys, based at least in part on the determination of whether the first range of time overlaps with the prospective range of time and whether the first temporal key is a pseudo-deleted key.

Another embodiment provides a method for identifying conflicts between a prospective temporal key and an index of temporal keys, where the temporal keys in the index are sorted based at least in part on a time value associated with each of the temporal keys. The method includes scanning the index of temporal keys to identify a next temporal key that potentially conflicts with the prospective temporal key. The method also includes determining whether the prospective temporal key conflicts with the next key, based at least in part on a determination of whether the prospective temporal key conflicts with the next temporal key and whether the next temporal key is a pseudo-deleted key. Additionally, the method includes continuing the scanning and determining steps until (i) a first temporal key with a different principal key value from the prospective temporal key is found, (ii) a non-overlapping temporal key that is not pseudo-deleted is found, the non-overlapping temporal key having an ending time after a starting time of the prospective temporal key, or (iii) no potentially conflicting keys remain in the index.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIGS. 2A-2D depict an index containing temporal keys, according to embodiments presented in this disclosure.

FIGS. 3A-3B depict page files for an index containing temporal keys, according to embodiments presented in this disclosure.

DETAILED DESCRIPTION

Figure 1:
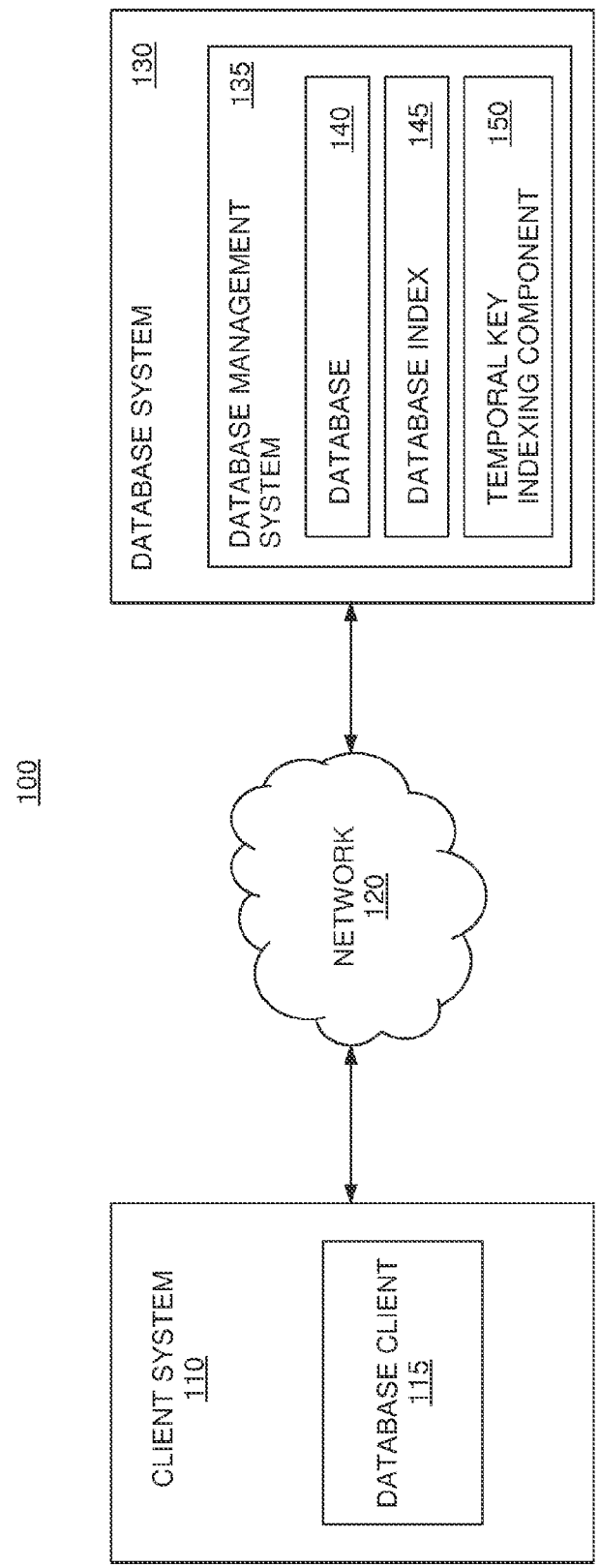
FIG. 1 is a block diagram illustrating a system configured to run a temporal key indexing component, according to one embodiment presented in this disclosure.

Generally, unique database indexes are designed such that each key in a database index is unique, so as to ensure the database index functions properly and to facilitate efficient lookups and accesses using the database index. Additionally, some database indexes contain temporal keys. Generally, a temporal key is a key specifying a principal key value and a period of time (e.g., by specifying when the period of time begins and when it ends). For example, an index for a conference room booking system could include temporal keys that include a principal key value specifying which conference room is being reserved and a time range specifying the period of time in which the conference room is reserved. As another example, an index for a scheduling system for a doctor's office could include temporal keys specifying a doctor with which the appointment is being scheduled (i.e., the principal key) and the period of time that the appointment with the specified doctor is scheduled for.

In the context of a unique database index containing temporal keys, the temporal keys should be unique such that no two temporal keys for a particular principal key specify an overlapping window of time. For instance, consider an index containing temporal keys relating to appointments at a doctor's office. In such an index, no doctor should have more than one appointment scheduled for any particular period of time. For example, assume the index contains a temporal key specifying an appointment for Dr. Smith (i.e., the principal key) at 9:00 am-10:00 am on Jan. 1, 2011. If a user attempts to insert a new temporal key specifying an appointment for Dr. Smith from 9:30 am-10:30 am on Jan. 1, 2011 into the index, this new key would create a conflict because the two keys overlap from 9:30 am until 10:00 am. In other words, a uniqueness conflict would be created because the period of time from 9:30 am to 10:00 am would not be unique within the index with respect to the principal key (i.e., Dr. Smith), which violates the fundamental design requirement of the unique index that every key in the index be unique. Thus, in this example, the new key should not be inserted into the index, so as to ensure uniqueness between the keys in the index and thereby helping to ensure proper functionality of the index.

As such, embodiments of the present invention provide techniques for identifying conflicts between a prospective temporal key and an index of temporal keys. In such an index, the temporal keys may be sorted based on a time value associated with each of the temporal keys. For instance, the temporal keys could be sorted based on the ending time of a time range specified by each of the keys. Embodiments may then scan the sorted index to identify a first temporal key within the index of temporal keys that potentially conflicts with the prospective temporal key. Once the first temporal key is identified, embodiments determine whether the first temporal key conflicts with the prospective temporal key. A conflict may be identified by comparing a first time value (e.g., a beginning time value) associated with the first temporal key and a prospective time value (e.g., an ending time value) associated with the prospective key. For example, a conflict could exist where an existing key in the index specifies a beginning time value that is after the beginning time value of the prospective key but is before the ending time of the prospective key. Upon determining that the first temporal key conflicts with the prospective temporal key, embodiments designate the prospective temporal key as conflicting with at least one existing temporal key in the index of temporal keys.

In a particular embodiment, the index may contain at least one pseudo-deleted temporal key. Generally, a pseudo-deleted key is a key for which a deletion operation has been performed for the corresponding entry (e.g., a row) in the database, but for which the deletion operation may not have yet been committed. As such, until the deletion operation is confirmed to have been committed, the key may be designated as pseudo-deleted. In such an index containing at least one pseudo-deleted temporal key, embodiments may further determine whether the aforementioned first temporal key is a pseudo-deleted key. If embodiments determine that the first temporal key conflicts with the prospective temporal key and that the first temporal key is further a pseudo-deleted key, embodiments may then confirm whether the deletion operation for the corresponding database entry for the first temporal key has been committed. Upon determining that the deletion operation was committed, embodiments may continue scanning the index to identify a second temporal key that potentially conflicts with the prospective temporal key. That is, since the first temporal key was found to be deleted from the index, embodiments may continue scanning the index to identify other potential conflicts. If instead embodiments determine that the deletion operation was rolled back, embodiments may designate the prospective temporal key as conflicting with at least one existing key in the index. That is, since the deletion operation was rolled back and since the first temporal key was found to conflict with the prospective temporal key, embodiments may determine that an actual conflict exists between the prospective temporal key and the first temporal key in the index.

FIG. 1 is a block diagram illustrating a system configured to run a temporal key indexing component, according to one embodiment presented in this disclosure. As shown, the system 100 includes a client system 110 and a database system 130, communicatively connected via a network 120. The client system includes a database client 115. Generally, the database client 115 represents any software application capable of submitting a database query to a DBMS 135. For instance, the database client 115 could be a software application configured to allow users to generate and submit database queries. As another example, the database client 115 could be a software application configured to submit one or more predefined database queries to the DBMS 135.

The DBMS 135 contains a database 140, database index 145 and a temporal key indexing component 150. The database 140 is a data store capable of containing a plurality of records (i.e., data) and is managed by the DBMS 135. The database index 145 is generally a data structure used to ensure rapid lookups and accesses of records in the database 140. For purposes of this example, assume that the database index 145 contains at least one temporal key. As discussed above, a temporal key refers to any key specifying a period of time (e.g., by specifying a beginning time and an ending time). The temporal key indexing component 150 generally manages the temporal keys in the database index 145. For instance, the temporal key indexing component 150 may insert new temporal keys into the database index 145. Since, as discussed above, each key in the database index 145 should be unique, the temporal key indexing component 150 generally ensures that the new temporal key does not conflict with any existing temporal keys in the index before inserting the new temporal key.

For instance, the temporal keys in the index could be sorted based on a time value associated with each of the temporal keys. As an example, the temporal keys could be sorted based on the ending time of a time range specified by each of the keys and then based on the starting time of the time range. The temporal key indexing component 150 may then scan the sorted index to identify a first temporal key within the index of temporal keys that potentially conflicts with the prospective temporal key. For instance, the temporal key indexing component 150 could scan the keys in the index in order and identify the first temporal key having an ending time value that is after the beginning time value of the prospective new key. Once the first temporal key is identified, embodiments determine whether the first temporal key conflicts with the prospective temporal key. A conflict may be identified by comparing a first time value associated with the first temporal key and a prospective time value associated with the prospective key. For example, a conflict could exist where an existing key in the index specifies a beginning time value (i.e., the first time value) that is after the beginning time value (i.e., a first prospective time value) of the prospective key but is before the ending time (i.e., a second prospective time value) of the prospective key. Upon determining that the first temporal key conflicts with the prospective temporal key, the temporal key indexing component 150 could designate the prospective temporal key as conflicting with at least one existing temporal key in the index of temporal keys. On the other hand, if the temporal key indexing component 150 determines that the first temporal key does not conflict with the prospective temporal key, the temporal key indexing component 150 could conclude that the prospective temporal key does not conflict with any keys in the index and accordingly insert the prospective key into the index.

In a particular embodiment, the index may contain at least one pseudo-deleted temporal key. As discussed above, a pseudo-deleted key is a key for which a deletion operation has been performed for the corresponding entry (e.g., a row) in the database. However, such a deletion operation may not have yet been committed, and the database management system may designate the key as pseudo-deleted until the deletion operation is confirmed. When considering such a pseudo-deleted key that conflicts with the prospective temporal key, the temporal key indexing component 150 may confirm whether the deletion operation for the corresponding database entry for the first temporal key has been committed. Upon determining that the deletion operation was committed, the temporal key indexing component 150 may continue scanning the index to identify a second temporal key that potentially conflicts with the prospective temporal key. That is, since the first temporal key was found to be deleted from the index, temporal key indexing component 150 could continue scanning the index to identify other potential conflicts. If instead the temporal key indexing component 150 determines that the deletion operation was rolled back, the temporal key indexing component 150 could designate the prospective temporal key as conflicting with at least one existing key in the index. That is, since the deletion operation was rolled back and since the first temporal key was found to conflict with the prospective temporal key, the temporal key indexing component 150 could determine that an actual conflict exists between the prospective temporal key and the first temporal key in the index. An example of pseudocode that could be used for managing insertions into an index containing pseudo-deleted temporal keys is shown below in Table I.

TABLE I

Exemplary Pseudocode

```
Loop:
    IF the found key is for a different key value OR there are no
        more keys in the index THEN
        Goto NoDuplicateFound
    IF the found key is pseudo deleted THEN
        IF the found key Overlaps the key to be inserted THEN
            Lock to ensure deleted entry is committed/wait for
                deletion to commit
            IF key is still deleted THEN
                Move to next index entry
                Goto Loop
            ELSE (Key no longer deleted, deletion must have
                rolled back)
                Goto DuplicateFound
        IF the found key does not overlap the key to be inserted
            THEN
            Move to next index entry
            Goto Loop
```

TABLE I-continued

Exemplary Pseudocode

```
    ELSE (found key is not a pseudo delete)
        IF the found key Overlaps the key to be inserted THEN
            Lock to ensure entry is committed/wait for
                insertion to commit
            IF key is still present and not a pseudo delete
                THEN
                Goto DuplicateFound
            ELSE
                Move to next index entry
                Goto Loop
        ELSE (non-pseudo-delete and it doesn't overlap)
            Goto NoDuplicateFOund
DuplicateFound:
    Code to handle duplicate Here
NoDuplicateFound:
    Code to handle 'No Duplicate' Here
```

An example using such pseudocode is discussed below with respect to FIGS. 2A-2D, which depict an index containing temporal keys, according to embodiments presented in this disclosure. For purposes of this example, assume that the database relates to a conference room booking system in which each conference room can only be booked once per any moment in time. Thus, for example, two different people would not be allowed to reserve the same conference room during the same period of time. Additionally, for this example, assume that the database is configured to use time data values with "CLOSED, OPEN" semantics, meaning that the time period represented includes the MEETING_BEGIN point in time and every other point in time up to, but not including, the MEETING_END time. Thus, a time value of (1:00 PM, 2:00 PM) includes 1:00 PM and every point in time up to, but not including, 2:00 PM. As shown, FIG. 2A depicts an index 200 containing a plurality of keys, with each key having a key # data value 202, a room data value 204, a meeting end time data value 206, a meeting begin time data value 208 and a pseudo-delete flag 210 indicating whether the key is a pseudo-deleted key. In the depicted example, the keys in the index 200 have been sorted in ascending order primarily by the room data value 204 and then secondarily by the meeting end and start time data values 206 and 208.

For purposes of this example, assume that the temporal key indexing component 150 is attempting to insert a key specifying a meeting for room A100 between "2010-01-01-09:00:00" and "2010-01-01-10:00:00." Upon receiving the prospective key to insert into the index, the temporal key indexing component 150 could scan the index in sorted order to identify the first key having a meeting end time 206 after the starting time of the prospective new key. Thus, in this example, FIG. 2B shows that the temporal key indexing component 150 has scanned the index 220 and identified that the key 222 is the first key for the room number A100 224 having an ending time subsequent to the starting time of the prospective key. Here, the temporal key indexing component 150 would identify the key 222 having a meeting end time 226 of "2010-01-01-10:01:00" and begin time 228 of "2010-01-01-09:01:00" as the first key having an ending time that is after the starting time of "2010-01-01-09:00:00" of the prospective new key.

The temporal key indexing component 150 would then determine whether the key 222 is a pseudo-deleted key, which is indicated by the pseudo-deleted flag 230. Upon determining that the key 222 is indeed a pseudo-deleted key, the temporal key indexing component 150 could then determine whether the key 222 overlaps with the prospective new key. In one embodiment, the temporal key indexing component 150 could determine whether the keys overlap based on whether the following condition is true: (start_time1<end_time2) & (start_time2 <end_time1). In this condition, the values start_time1 and end_time1 refer to the start and end times for the prospective new key to be inserted into the index, while the values start_time2 and end_time2 correspond to the existing key in the index being considered (i.e., the key 222 in the present example). Thus, here the temporal key indexing component 150 would determine that the key 222 does overlap with the prospective new key.

Upon determining that prospective new key overlaps with the key 222 and having already confirmed that the key 222 is a pseudo-deleted key, the temporal key indexing component 150 could then confirm whether the key 222 has actually been deleted. That is, the temporal key indexing component 150 could confirm whether the database management system has committed the deletion operation. Upon determining that the deletion operation for the key 222 was rolled back, the temporal key indexing component 150 could conclude that an actual conflict exists for the prospective new key. However, if the temporal key indexing component 150 instead confirms that the deletion operation for the key 222 was committed, the temporal key indexing component 150 would continue scanning the index to identify the next potentially conflicting key.

Thus, the diagram 240 in FIG. 2C shows that the temporal key indexing component 150 has identified the key 242 as the next key in the index having a room value 244 of "A100" that has an ending time value 246 after the beginning time value of the prospective new key. The temporal key indexing component 150 could then determine the key 242 is a pseudo-deleted key, based on the pseudo-deleted flag 250 for the key 242. However, unlike the key 222, the temporal key indexing component 150 could determine that the key 242 does not conflict with the prospective new key by comparing the starting time 248 and ending time 246 with the starting and ending times for the prospective new key. That is, since the ending time of the prospective new key "2010-01-01-10:00:00" is non-inclusive, meaning that the time range expressed by the prospective new key captures every point in time from the beginning time up until the ending time, the prospective new key does not conflict with the key 242 having a starting time of "2010-01-01-10:00:00". As such, the temporal key indexing component 150 could continue scanning the index to identify the next potentially conflicting key.

Continuing the example with reference to FIG. 2D, the diagram 260 shows that the temporal key indexing component 150 has determined that the key 262 is the next key in the index for the room A100 (as indicated by the room value 264) with an ending time value 266 after the starting time of the prospective new key. Here, the temporal key indexing component 150 could determine that the key 262 is not a pseudo-deleted key, based on the value 270. The temporal key indexing component 150 could then determine whether the key 262 overlaps with the prospective new key, based on the starting time 268 and ending time 266 of the key 262 and the corresponding times for the prospective new key. Thus, in this example, since the prospective new key specifies a meeting time from 9:00 until 10:00 and the key 262 specifies a meeting between the hours of 12:00 until 13:00, the temporal key indexing component 150 would determine that the prospective new key does not conflict with any keys in the index. Accordingly, the temporal key indexing component 150 could proceed to insert the prospective new key into the index at the appropriate spot (i.e., at a position that maintains the sorted order of the index).

In particular embodiments, a database index may span across multiple page files. As the temporal key indexing component 150 scans the index serially in sorted order, potential problems could arise if another entity (e.g., a separate thread or process) modified values in the index at a position that the temporal key indexing component 150 has already scanned past. Accordingly, the temporal key indexing component 150 may be configured to lock particular values in the index while scanning to prevent any serialization problems from arising. For instance, if the temporal key indexing component 150 scans keys on a first page file and then detects that keys on a second page file should also be analyzed, the temporal key indexing component 150 could be configured to obtain a key value lock on all keys related to the prospective new key in both page files. Thus, in the current example, rather than locking all the key values in the page files, the temporal key indexing component 150 could acquire a key value lock only for the room number associated with the prospective key (i.e., room number "A100").

An example of this will now be discussed with respect to FIGS. 3A-3B, which depict page files for an index containing temporal keys, according to embodiments presented in this disclosure. For purposes of this example, assume that the temporal key indexing component 150 is attempting to insert the aforementioned prospective key specifying a meeting for room A100 between "2010-01-01-09:00:00" and "2010-01-01-10:00:00." In doing so, the temporal key indexing component 150 could begin scanning the first page file 300 of the index as shown in FIG. 3A. For instance, the temporal key indexing component 150 could scan the index to identify the first key having an ending time value that is subsequent to the starting time value of the prospective new key. Thus, the temporal key indexing component 150 could consider the key in page file 300 and determine that the key has the room value 302 of A100 and that the ending time 304 of "2010-01-01-09:30:00" falls after the starting time of the prospective key (i.e., "2010-01-01-09:00:00." However, the temporal key indexing component 150 could further determine that the depicted key is a pseudo-deleted key. The temporal key indexing component 150 could then confirm that the deletion operation associated with the depicted key was deleted and thus could continue scanning the index.

However, since there are no more keys for the room A100 in the page file 300, the temporal key indexing component 150 could determine that a second page file for the index should be scanned. For instance, the temporal key indexing component 150 could determine that the page file 320 shown in FIG. 3B should also be scanned to identify any keys that conflict with the prospective new key. In order to avoid any serialization problems (e.g., another thread inserting a new conflicting key into the page file 300), the temporal key indexing component 150 could place a key value lock on all the keys in the first page file 300 and the second page file 320 related to the prospective new key. Thus, for example, the temporal key indexing component 150 could place a key value lock all the value part of the keys in the page files 300 and 320 relating to the value part of the prospective new key (i.e., room number "A100"). Upon acquiring the key value lock on the values within the related keys, the temporal key indexing component 150 could continue scanning the page file 320 to determine whether any of the keys 330 conflict with the prospective new key.

Figure 4:
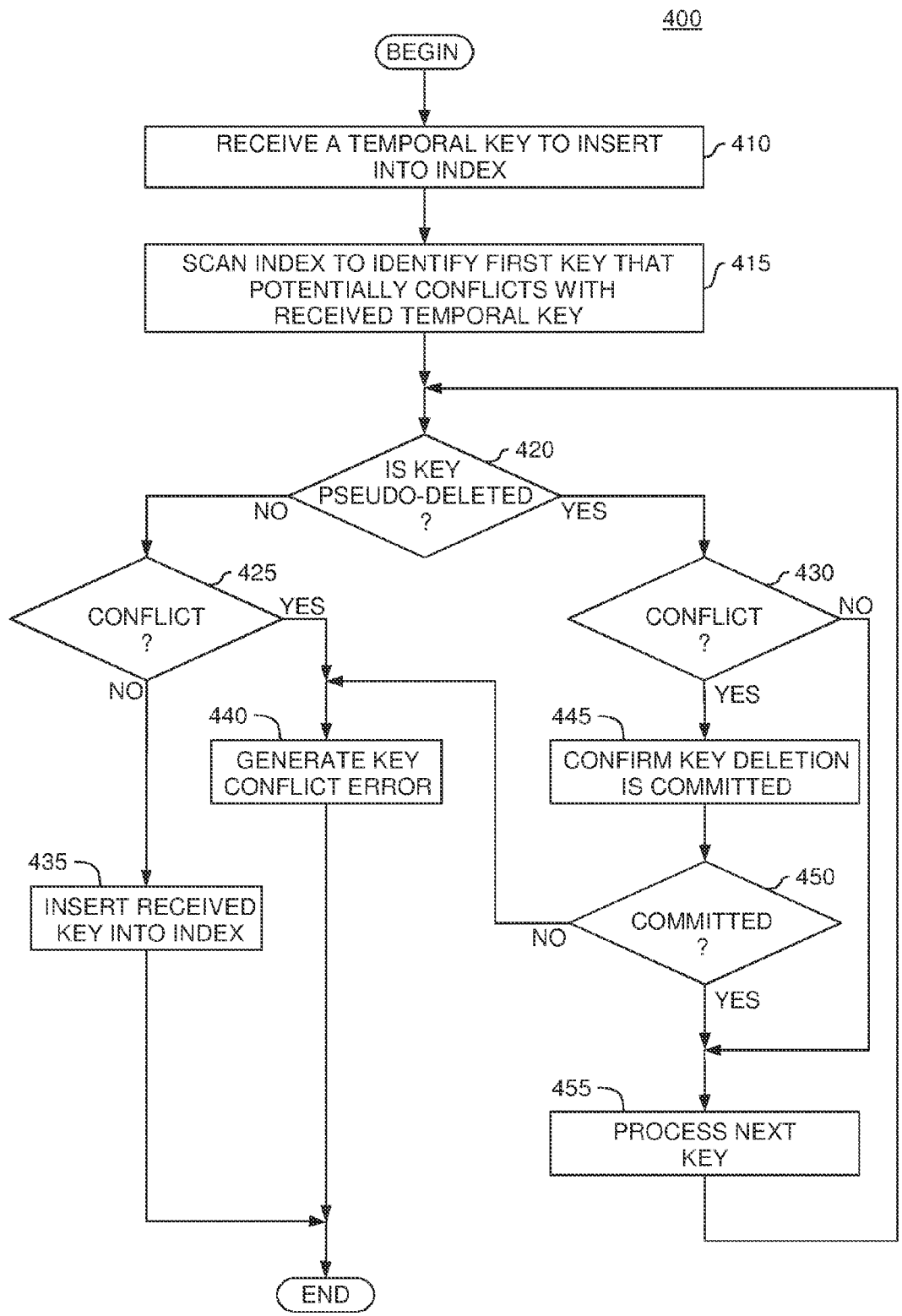
FIG. 4 is a flow diagram illustrating a method of inserting a temporal key into an index, according to one embodiment presented in this disclosure.

FIG. 4 is a flow diagram illustrating a method of inserting a temporal key into an index, according to one embodiment presented in this disclosure. As shown, the method 400 begins at step 410, where the temporal key indexing component 150 receives a temporal key to insert into an index of temporal keys (step 410). Generally, the keys within the index are sorted based on time values associated with each of the keys.

For purposes of this example, assume that the keys in the index are sorted in ascending order by their ending times. The temporal key indexing component 150 then scans the index to identify a first key that potentially conflicts with the received temporal key (step 415). Of note, because the keys are in a sorted order, the temporal key indexing component 150 may be able to determine whether any keys in the index conflict with the prospective temporal key based on the first potentially conflicting key identified when scanning the index. In other words, because of the manner in which the index is sorted, in some situations, the temporal key indexing component 150 may be able to conclude that if the prospective temporal key does not conflict with the first temporal key, then the prospective temporal key does not conflict with any of the keys in the index.

To this end, upon identifying the first potentially conflicting key, the temporal key indexing component 150 determines whether the first key is a pseudo-deleted key (step 420). As discussed above, a key in an index may be a pseudo-deleted key if the database entry corresponding to the key has been marked deleted, but that deletion operation has not yet been confirmed. That is, certain database management systems may mark a key as pseudo-deleted until the committal (or rollback) of the deletion operation has been confirmed. If the temporal key indexing component 150 determines the first potentially conflicting key is a pseudo-deleted key, the temporal key indexing component 150 then determines whether the first key conflicts with the prospective key (step 430). If the temporal key indexing component 150 determines that no conflict exists between first temporal key and the prospective temporal key, the temporal key indexing component 150 continues scanning the index and processes the next potentially conflict key (step 455) and the method 400 returns to step 420. On the other hand, if the temporal key indexing component 150 determines that the first key conflicts with the prospective key, the temporal key indexing component 150 then confirms whether the deletion operation has been committed (step 445). That is, the temporal key indexing component 150 determines whether the deletion operation has been finalized, based on whether the deletion operation was committed or rolled back.

If the temporal key indexing component 150 determines the deletion was finalized, then the temporal key indexing component 150 continues scanning the index and processes the next potentially conflicting key (step 455) and the method 400 returns to step 420, where the temporal key indexing component 150 determines whether the next potentially conflict key is a pseudo-deleted key. If instead the temporal key indexing component 150 determines that the deletion operation was rolled back and not finalized, the temporal key indexing component 150 generates a key conflict error (step 440) and the method 400 ends. That is, upon determining that the first temporal key actually conflicts with the prospective temporal key and that the first temporal key has not been deleted, the temporal key indexing component 150 determines that a conflict actually exists and generates the key conflict error.

If, at step 420, the temporal key indexing component 150 determines that the first temporal key is not a pseudo-deleted key, then the temporal key indexing component 150 determines whether the first temporal key conflicts with the prospective temporal key (step 425). Upon determining that the first temporal key does conflict with the prospective key, the temporal key indexing component 150 generates a key conflict error (step 440) and the method 400 ends. If instead the temporal key indexing component 150 determines that there is no conflict between the first temporal key and the prospective temporal key, the temporal key indexing component 150 inserts the prospective temporal key into the index (step 435) and the method 400 ends.

Of note, in the method 400, because the index is sorted at least in part by the time values for the temporal keys, the temporal key indexing component 150 may determine that the prospective temporal key does not conflict with any keys in the index if the prospective key does not conflict with the first potentially conflicting key in the index. For example, the index could be sorted at least in part in ascending order based on the ending time values of the temporal keys. In such an example, the temporal key indexing component 150 could scan the sorted index to identify the first key having an ending time that is after the starting time of the prospective temporal key. If the temporal key indexing component 150 determines that this first key does not conflict with the prospective temporal key and further determines that this first key has not been deleted (or that any such deletion operation has been rolled back), then the temporal key indexing component 150 could conclude that no key in the index conflicts with the prospective temporal key. Advantageously, doing so allows the temporal key indexing component 150 to avoid comparing all the keys in the index with the prospective temporal key.

Figure 5:
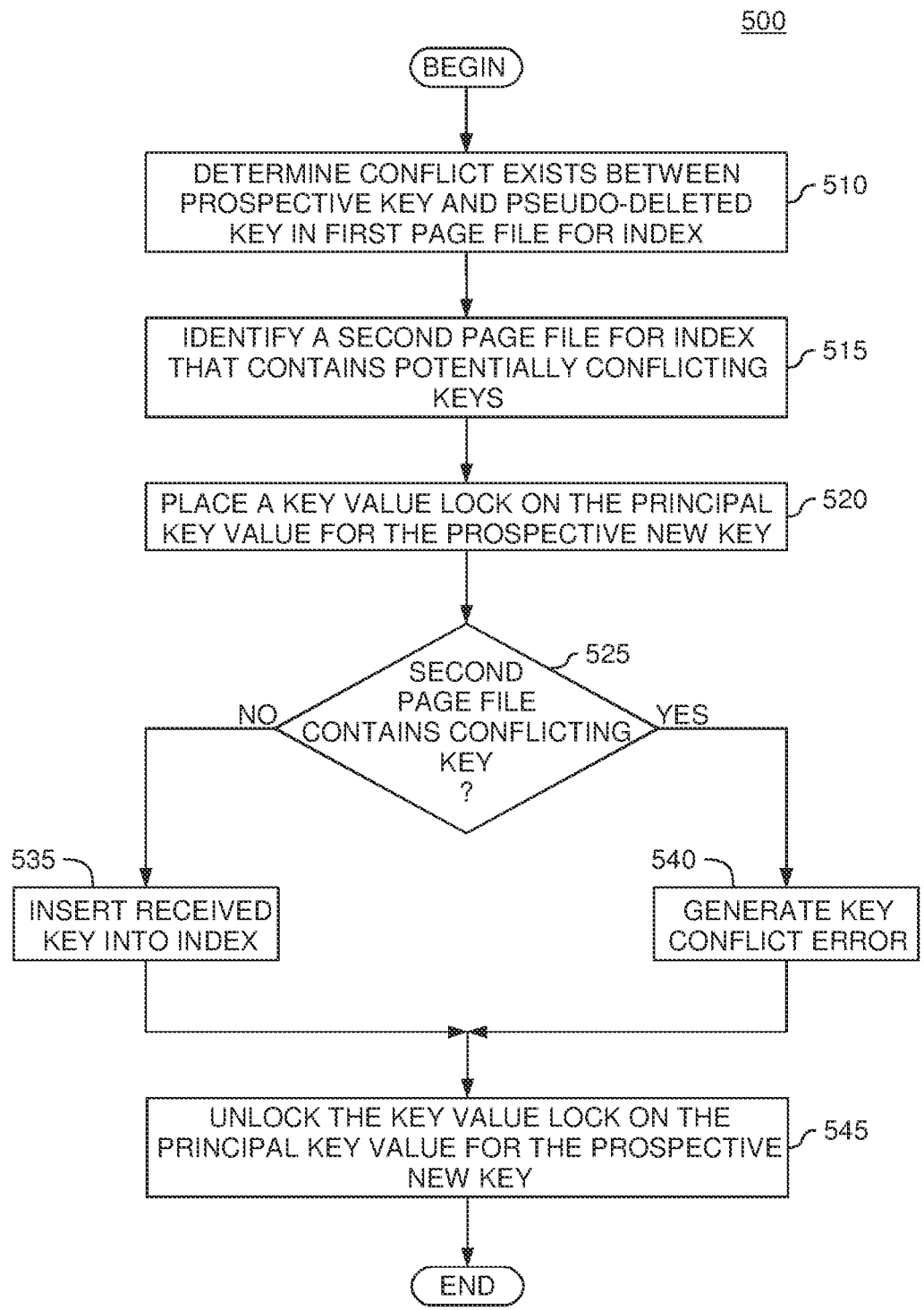
FIG. 5 is a flow diagram illustrating a method of inserting a temporal key into an index, according to one embodiment presented in this disclosure.

FIG. 5 is a flow diagram illustrating a method of inserting a temporal key into an index, according to one embodiment presented in this disclosure. As shown, the method 500 begins at step 510, where the temporal key indexing component 150 determines that a conflicting pseudo-deleted key exists in the first page file for an index. Thus, the temporal key indexing component 150 could determine that more keys in the index should be processed before concluding that no conflict exists for the prospective temporal key (e.g., as in step 455 of the method 400). The temporal key indexing component 150 then identifies a second page file for the index that contains one or more potentially conflicting keys for the prospective temporal key (step 515).

Upon identifying the second page file for the index, the temporal key indexing component 150 places a key value lock on the principal key value for the prospective new key (step 520). As discussed above, certain indexes may contain temporal keys relating to more than one principal key value. For example, a particular index could contain temporal keys relating to scheduling appointments for multiple doctors, where each doctor is represented using a different principal key value. For instance, in such an index, the primary value could be the name of the doctor that each appointment is scheduled with and the index could enforce uniqueness amongst the temporal keys for a particular doctor. That is, while two 9:00 am-10:00 am appointments could be scheduled for two different doctors, overlapping appointments should generally not be allowed to exist for the same doctor. Thus, since there may be keys relating to multiple primary values in the index, the temporal key indexing component 150 obtains a key value lock only on the unique key value of the prospective temporal key. Here, the key value lock prevents any insertions or modifications of temporal keys having the locked principal value. Thus, continuing the example, if the prospective temporal key specifies a new appointment with "Dr. Smith" (i.e., the principal key value), the temporal key indexing component 150 could obtain a key value lock on the principal key value of "Dr. Smith", thereby preventing any insertions or deletions of temporal keys within the index relating to the principal key value of "Dr. Smith". Of note, such a key value lock may prevent key modifications or insertions across a single page file of the index, or may prevent such modifications or insertions across a plurality of page files of the index.

Once the key value lock is obtained, the temporal key indexing component 150 determines if the second page file contains any keys that conflict with the prospective temporal key (step 525). If the temporal key indexing component 150 determines the second page file contains a conflicting key, the temporal key indexing component 150 generates a key conflict error (step 540). If instead the temporal key indexing component 150 determines that the second page file does not contain any conflicting keys, the temporal key indexing component 150 inserted the received prospective key into the index (step 535). Once the prospective key is inserted into the index or once the key conflict error is generated, the temporal key indexing component 150 unlocks the key value lock on the principal key value of the prospective key (step 545) and the method 500 ends. Advantageously, doing so prevents any serialization problems that may arise while the temporal key indexing component 150 is processing keys in subsequent page files (i.e., the second page file in the depicted example). That is, by acquiring the key value lock, the method 500 prevents a situation where another entity (e.g., another process or thread) alters the keys at a location in the index the temporal key indexing component 150 has already scanned.

Of note, although FIG. 5 deals with an index containing only two page files, one of ordinary skill in the art will appreciate that embodiments of the present invention may be used with indexes containing any number of page files. Thus, although in step 525 of the above example the temporal key indexing component 150 considered only the second page file, in other embodiments, the temporal key indexing component 150 could continue scanning any number of subsequent page files to identify any conflicting keys in the index. For instance, in a particular embodiment, the temporal key indexing component 150 is configured to continue scanning until (i) the temporal key indexing component 150 finds a key with a different principal key value (e.g., when the temporal key indexing component 150 finds a key relating to "Dr. Jones", if the prospective key specifies a new appointment with "Dr. Smith"), (ii) the temporal key indexing component 150 finds a key with the same principal key value but that does not temporally overlap with the prospective key and is not pseudo-deleted, or (iii) there are no more keys in the index.

Figure 6:
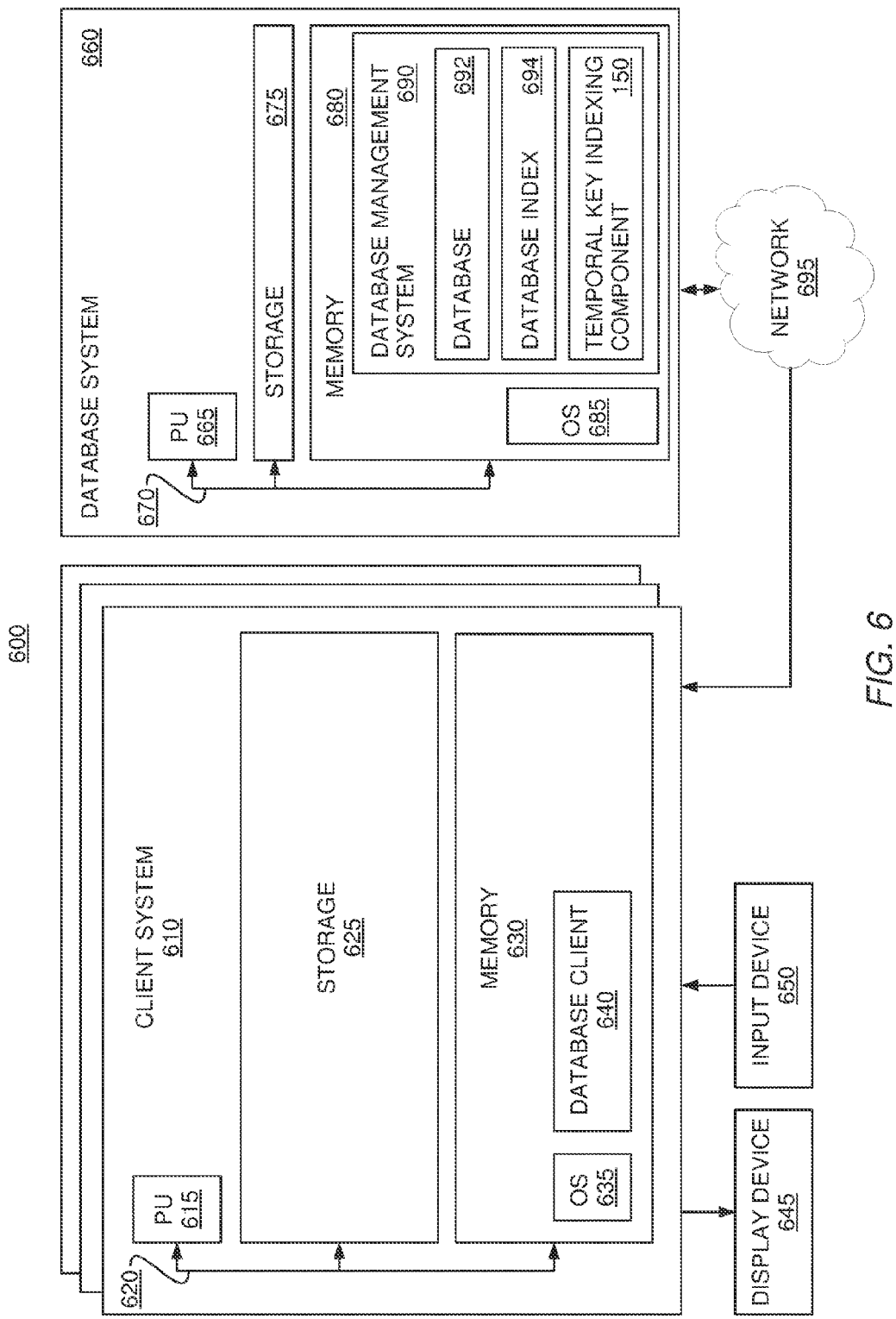
FIG. 6 is a block diagram illustrating a system configured to run a temporal key indexing component, according to one embodiment presented in this disclosure.

FIG. 6 is a block diagram illustrating a system configured to run a temporal key indexing component, according to one embodiment presented in this disclosure. As shown, the system 600 includes a plurality of client systems 610 and a database system 660, communicatively coupled via a network 695. In one embodiment, the client systems 610 may include existing computer systems, e.g., desktop computers, server computers, laptop computers, tablet computers, mobile devices (e.g., mobile phones), gaming consoles, hand-held gaming devices and the like. The client systems 610 illustrated in FIG. 6, however, are merely examples of computer systems in which embodiments of the present invention may be used. Embodiments of the present invention may be implemented differently, regardless of whether the computer systems are complex multi-user computing systems, such as a cluster of individual computers connected by a high-speed network, single-user workstations, or network appliances lacking non-volatile storage. Moreover, it is explicitly contemplated that embodiments of the invention may be implemented using any device or computer system capable of performing the functions described herein.

As shown, each client system 610 includes, without limitation, a processor 615, which obtains instructions and data via a bus 620 from a memory 630 and storage 625. Processor 615 is a programmable logic device that performs instruction, logic, and mathematical processing, and may be representative of one or more CPUs. Storage 625 is representative of hard-disk drives, flash memory devices, optical media and the like. Generally, the storage 625 stores application programs and data for use by the client system 610. The client systems 610 are operably connected to the network 695, e.g., via network interfaces.

The memory 630 is any memory sufficiently large to hold the necessary programs and data structures. Memory 630 could be one or a combination of memory devices, including Random Access Memory, nonvolatile or backup memory (e.g., programmable or Flash memories, read-only memories, etc.). In addition, memory 630 and storage 625 may be considered to include memory physically located elsewhere; for example, on another computer coupled to the client system 610 via bus 620. The memory 630 includes a database client 640 and an operating system ("OS") 635. Operating system 635 is software used for managing the operation of the client system 610. Examples of OS 635 include UNIX, versions of the Microsoft Windows® operating system and distributions of the Linux® operating system. (Note: Linux is a trademark of Linus Torvalds in the United States and other countries.) More generally, any operating system 635 capable of performing the functions described herein may be used.

Additionally, the client systems 610 are each coupled to display devices 645 and input devices 650. The display devices 645 may include output devices such as monitors, touch screen displays, and so on. For instance, the display devices 645 may include a display device used to visually depict a user interface through which a user may form database queries to submit to the DBMS 690. The input devices 650 represent a wide variety of input devices, including keyboards, mice, controllers, microphones, and so on.

As shown, the database system 660 includes, without limitation, a processor 665, which obtains instructions and data via a bus 670 from a memory 680 and storage 675. Processor 665 is a programmable logic device that performs instruction, logic, and mathematical processing, and may be representative of one or more CPUs. Storage 675 is representative of hard-disk drives, flash memory devices, optical media and the like. Generally, the storage 675 stores application programs and data for use by the database system 660. The database system 660 is operably connected to the network 695, e.g., via a network interface.

The memory 680 is any memory sufficiently large to hold the necessary programs and data structures. Memory 680 could be one or a combination of memory devices, including Random Access Memory, nonvolatile or backup memory (e.g., programmable or Flash memories, read-only memories, etc.). In addition, memory 680 and storage 675 may be considered to include memory physically located elsewhere; for example, on another computer coupled to the database system 660 via bus 670. The memory 680 includes a DBMS 690 and an OS 685. Operating system 685 is software used for managing the operation of the database system 660. Examples of OS 685 include UNIX, versions of the Microsoft Windows® operating system and distributions of the Linux® operating system. More generally, any operating system 685 capable of performing the functions described herein may be used.

As shown, the DBMS 690 contains a database 692, a database index 694 and a temporal key indexing component 150. The database index 694 is generally a data structure used to ensure rapid lookups and efficient access of records in the database 692. Furthermore, although the database 692 is shown as contained entirely in memory 680, such a depiction is for illustrative purposes only. Moreover, one of ordinary skill in the art will recognize that the database 692 could be contained not only in memory 680 but in a variety of locations, including, for example, storage 675, another storage device altogether (e.g., a remote storage device via bus 670), or a mix thereof.

As discussed above, the temporal key indexing component 150 generally manages the database index 694 that contains temporal keys. For instance, the temporal key indexing component 150 could add an entry (i.e., a key) to the database index 694 that contains timestamp and time zone data. In doing so, the temporal key indexing component 150 could ensure that there is not an overlapping temporal key in the database index 694 before inserting the new entry into the index 694. For instance, the temporal key indexing component 150 could scan the index to identify a first potentially conflicting key. The temporal key indexing component 150 could then compare the prospective new key with the first potentially conflicting key to determine whether a conflict exists between the two. Upon determining no conflict exists, the temporal key indexing component 150 could insert the new entry into the index. Advantageously, doing so ensures that the database index 694 will not contain any overlapping temporal keys.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user could submit a database query (e.g., using the database client 640) specifying a new temporal key to be inserted into an index for a database or other data store available in the cloud. For example, a DBMS configured with a temporal key indexing component 150 could execute on a computing system in the cloud and maintain a database index containing temporal keys. Upon receiving the database query specifying the prospective new temporal key, the temporal key indexing component 150 could determine if a conflict exists between the new temporal key and the temporal keys within the index and, if not, could insert the new temporal key into the index. Doing so allows users to submit queries relating to temporal keys from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations, can be implemented by special-purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for identifying conflicts between an index of temporal keys and a prospective temporal key to be inserted into the index, wherein the temporal keys in the index are sorted based at least in part on a time value associated with each of the temporal keys, comprising:

determining whether a first range of time specified by a first temporal key within the index of temporal keys overlaps with a prospective range of time specified by the prospective temporal key; and determining whether the prospective temporal key conflicts with any temporal keys in the index of temporal keys, wherein the prospective temporal key conflicts with the first temporal key if the first range of time overlaps with the prospective range of time and the first temporal key is not a pseudo-deleted key, and further comprising:

scanning the index of temporal keys to identify a next temporal key that potentially conflicts with the prospective temporal key; and determining whether the prospective temporal key conflicts with the next key, based on whether the prospective range of time conflicts with a next range of time specified by the next temporal key and whether the next temporal key is a pseudo-deleted key, wherein the scanning and determining are repeated until (i) a first temporal key with a different principal key value from the prospective temporal key is found, (ii) a non-overlapping temporal key that is not pseudo-deleted is found, or (iii) no potentially conflicting keys remain in the index.

2. The method of claim 1, further comprising:

upon determining that the prospective temporal key does not conflict with any temporal keys in the index of temporal keys, inserting the prospective temporal key into the index of temporal keys; and upon determining that the prospective temporal key conflicts with at least one temporal key in the index of temporal keys, designating the prospective temporal key as a conflicting key.

3. The method of claim 1, wherein determining whether a first range of time specified by the first temporal key overlaps with a prospective range of time specified by the prospective temporal key further comprises at least one of:

comparing a starting time value associated with the first range of time with an ending time value associated with the prospective range of time; and comparing an ending time value associated with the first range of time with a starting time value associated with the prospective range of time.

4. The method of claim 1, further comprising:

scanning the index of temporal keys in sorted order to identify the first temporal key within the index of temporal keys, wherein the first temporal key is the first scanned key having an ending time that is later than the starting time of the prospective temporal key.

5. The method of claim 1, wherein the first temporal key is stored in a first page file, and further comprising:

acquiring a key value lock for a principal key value of the prospective temporal key, wherein the key value lock prevents any insertions or modifications of additional keys having the same principal key value in the index; and upon (i) determining that the prospective temporal key conflicts with at least one of the keys in the index of temporal keys or (ii) determining that the prospective temporal key does not conflict with any keys in the index of temporal keys and inserting the prospective temporal key into the index of temporal keys, releasing the key value lock on the principal key value of the prospective temporal key.

6. The method of claim 1, further comprising:
upon determining that the first temporal key is a pseudo-deleted key, determining whether a deletion operation associated with the first temporal key has been committed; and
upon determining that the deletion operation associated with the first temporal key has been committed, analyzing a next temporal key in the index of temporal keys to identify any conflicts with the prospective temporal key.

7. The method of claim 6, further comprising:
upon determining that the prospective temporal key conflicts with at least one temporal key in the index of temporal keys and that the deletion operation associated with the first temporal key has been rolled back, designating the prospective temporal key as a conflicting key.

8. A method for identifying conflicts between an index of temporal keys and a prospective temporal key to be inserted into the index, wherein the temporal keys in the index are sorted based at least in part on a time value associated with each of the temporal keys, comprising:
  determining whether a first range of time specified by a first temporal key within the index of temporal keys overlaps with a prospective range of time specified by the prospective temporal key;
  determining whether the prospective temporal key conflicts with any temporal keys in the index of temporal keys, wherein the prospective temporal key conflicts with the first temporal key if the first range of time overlaps with the prospective range of time and the first temporal key is not a pseudo-deleted key; and
  upon determining that the prospective temporal key does not conflict with the first temporal key:
    scanning the index of temporal keys to identify the next temporal key that potentially conflicts with the prospective temporal key, wherein the next temporal key specifies a next range of time; and
    determining whether the prospective temporal key conflicts with the next key, wherein the prospective temporal key conflicts with the next temporal key if the next range of time overlaps with the prospective range of time and the next temporal key is not a pseudo-deleted key,
  wherein the scanning and determining are repeated until (i) a first temporal key with a different principal key value from the prospective temporal key is found, (ii) a non-overlapping temporal key that is not pseudo-deleted is found, the non-overlapping temporal key having a starting time after an ending time of the prospective temporal key, or (iii) no potentially conflicting keys remain in the index.

* * * * *